US010656502B1

(12) United States Patent
Sandoval

(10) Patent No.: US 10,656,502 B1
(45) Date of Patent: May 19, 2020

(54) RAPID DEPLOYMENT SURVEILLANCE SYSTEM

(71) Applicant: Shaun Sandoval, Larkspur, CO (US)

(72) Inventor: Shaun Sandoval, Larkspur, CO (US)

(*) Notice: Subject to any disclaimer, the term of this patent is extended or adjusted under 35 U.S.C. 154(b) by 0 days.

(21) Appl. No.: 15/888,925

(22) Filed: Feb. 5, 2018

Related U.S. Application Data

(60) Provisional application No. 62/455,482, filed on Feb. 6, 2017.

(51) Int. Cl.
| | | |
|---|---|---|
| *G03B 17/56* | (2006.01) | |
| *F16M 13/02* | (2006.01) | |
| *G03B 17/02* | (2006.01) | |
| *H04N 5/225* | (2006.01) | |
| *F16M 11/38* | (2006.01) | |

(52) U.S. Cl.
CPC .......... *G03B 17/561* (2013.01); *F16M 11/38* (2013.01); *F16M 13/022* (2013.01); *G03B 17/02* (2013.01); *H04N 5/2252* (2013.01); *H04N 5/2253* (2013.01)

(58) Field of Classification Search
None
See application file for complete search history.

(56) References Cited

U.S. PATENT DOCUMENTS

| | | | | |
|---|---|---|---|---|
| 6,015,123 A | * | 1/2000 | Perez | F16M 13/02 248/201 |
| 2007/0166027 A1 | * | 7/2007 | Misawa | G03B 17/02 396/529 |
| 2009/0289405 A1 | * | 11/2009 | Hill | A47G 7/044 269/254 R |
| 2010/0005636 A1 | * | 1/2010 | Liao | A42B 3/04 24/652 |
| 2014/0360893 A1 | * | 12/2014 | Whitten | A45C 11/00 206/45.2 |
| 2015/0346588 A1 | * | 12/2015 | Hudson | G03B 17/561 248/220.22 |
| 2015/0370149 A1 | * | 12/2015 | Jackson | G03B 17/561 396/419 |
| 2017/0199446 A1 | * | 7/2017 | Ciccolini | G03B 17/02 |
| 2017/0277020 A1 | * | 9/2017 | Kasai | B60R 11/04 |
| 2018/0084200 A1 | * | 3/2018 | Liang | F16B 1/00 |

* cited by examiner

*Primary Examiner* — William B Perkey
(74) *Attorney, Agent, or Firm* — Ramon L. Pizarro; Edwin H. Crabtree

(57) ABSTRACT

A portable surveillance system having a camera enclosure with a support plate with converging sides and a support bracket. The support bracket having a pair of spaced apart slots that accept the pair of converging sides of the support plate, so that the support plate becomes wedged in the support plate slots when inserted into the converging slots of the support bracket. The support bracket may be attached to a support clamp or a support or a support base, the support base allows mounting from various other support structures, such as the support bracket, a support post. The support post may be supported by a person or structure found on a vehicle, such as a receiver hitch on a vehicle.

4 Claims, 3 Drawing Sheets

RAPID DEPLOYMENT SURVEILLANCE SYSTEM

REFERENCE TO RELATED APPLICATIONS

This application claims the benefit of my U.S. provisional application titled RAPID DEPLOYMENT SURVEYLLANCE SYSTEM, having Ser. No. 62/455,482, filed Feb. 6, 2017.

BACKGROUND OF THE INVENTION

(a) Field of the Invention

This application relates to a system for supporting surveillance cameras and related peripheral equipment from a variety of support surfaces and structures. Examples of the system include a clamp that supports a surveillance camera from a wall, and other examples allow the support of cameras from a pole, a support hitch, or a tripod.

(b) Discussion of Known Art

The need for support systems that can be used to activate cameras in a short period of time has been long recognized. Towards this end, there are solutions that apply to television news vehicles, systems that are used by sports and outdoors enthusiast, and systems that are used by law enforcement. Each of these applications has distinct needs. For example, news vehicles are capable of carrying large, conspicuous, telescoping booms that can be supported from the vehicle. The boom will support cameras that record news events as they happen. Accordingly, systems that are designed for news reporting companies are often conspicuous and large. The conspicuous aspect serves the news reporting company in letting law enforcement agencies and members of the public know who they are and where they are.

Camera support systems for use by sports and outdoors enthusiasts are typically very small, for they are carried on the body of a person. Law enforcement personnel also carry personal body cameras, but these cameras are only activated while the officer is on duty, and record what is in front of that specific officer.

Law enforcement surveillance operations, on the other hand, require observation of specific areas for longer periods of time. For example, when observing activities at public locations, such as parks, streets, or public gathering places, it is important to be able to position surveillance cameras at those locations for short periods of time. For example, at a location where public demonstrations, or sports events such as races, are to take place, it is only necessary to position surveillance equipment for short periods of time.

Additionally, it is also important to ensure that surveillance equipment is unobtrusive, easy to move and deploy, capable of being controlled remotely, and also be robust. Still further, these systems should be capable of being installed from various commonly occurring structural features. For example roofs, walls at the edges of roofs, law enforcement vehicles, as well as from tripods.

However, if the systems are to be supported from tripods, it is important that the tripod be capable of accommodating a wide variety of terrains, since surveillance of sloping areas next to roads or forested areas is often necessary. Still further, it is important that surveillance cameras that are used for the purpose of gathering evidence be inconspicuous, and thus allowing observation of activity without causing interruptions in the activity.

Another problem associated with the development of surveillance systems is that they often need to be carried to their installation locations by personnel on foot or on all-terrain vehicles. This requires that the system be easily configured to be deployed and capable of being stowed in a container or carrying device that allows transport by a person, or on an all-terrain vehicle.

Another important aspect needed for temporary surveillance systems to be used by law enforcement is that the system be easily adapted in the field, and thus allow rapid deployment using existing structures or features found in the field. Accordingly, there is a need for a system that is very versatile.

Yet another important aspect of surveillance systems for use by law enforcement is that the system be capable of use for extended periods of time at locations were access to an existing electrical grid is difficult or not available.

Therefore, a review of known devices reveals that there remains a need for a surveillance system that can be easily modified to suit various terrains, locations, and social situations. Still further there remains a need for a versatile surveillance system that can be easily transported by a person, or on a vehicle, and easily modified to allow recording sound and images from the vehicle or from a variety of structural features, such as trees or buildings, for example.

SUMMARY

It has been discovered that the problems left unanswered by known art can be solved by providing a system that allows the support of surveillance equipment from various structures, and an example includes:
- a camera enclosure, the camera enclosure having sidewalls, a top, a bottom, and a window;
- a generally planar support plate that is attached to the enclosure at a location along the sidewalls, the support plate having a generally planar body, the generally planar body;
- a support bracket, the support bracket having a pair of spaced apart slots that are adapted for accepting the pair of converging sides of the support plate, so that the support plate becomes wedged in the support plate slots when inserted into the converging slots of the support bracket, so that the support bracket accepts and retains the support plate and the enclosure.

According to an example, the system may be mounted from pole or beam that extends from a support clamp that accommodates various features of items that may be found in the field. These features include walls and protrusions and surfaces of buildings, as well as utility poles, as examples. A bracket disclosed here may be easily attached to a pole, or any structural surface using mechanical fasteners or banding straps.

Additionally, examples and structure disclosed here allow support of batteries, communication equipment, and recording equipment used with the surveillance equipment to be supported from the disclosed systems. Still further, it is contemplated that additional systems, such as solar panels, may also be used with the disclosed arrangements to extend the operation time of the surveillance equipment.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
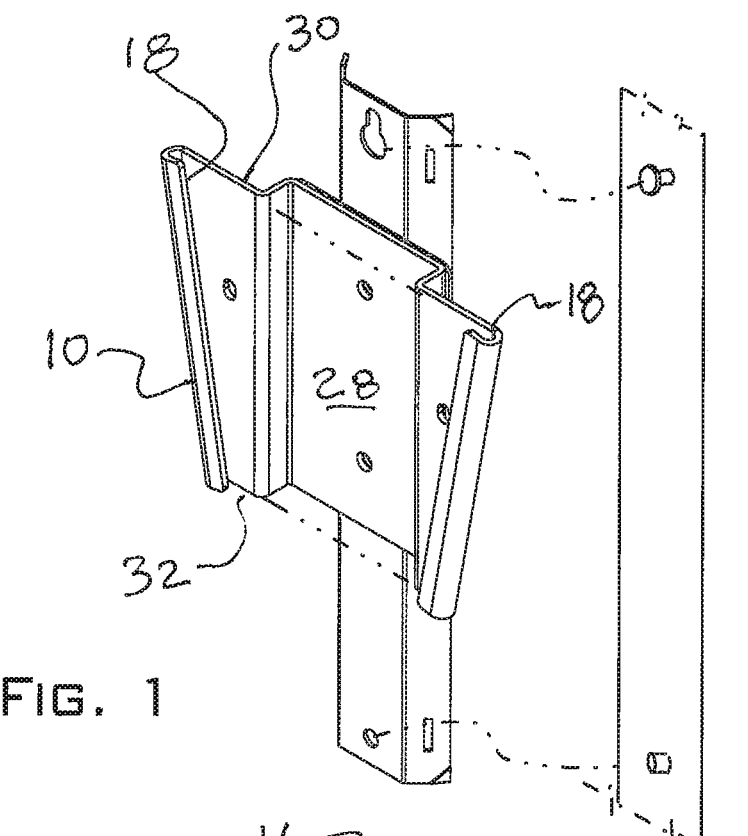
FIG. 1 is a perspective view of an embodiment of a bracket used with disclosed embodiments.
Figure 2:
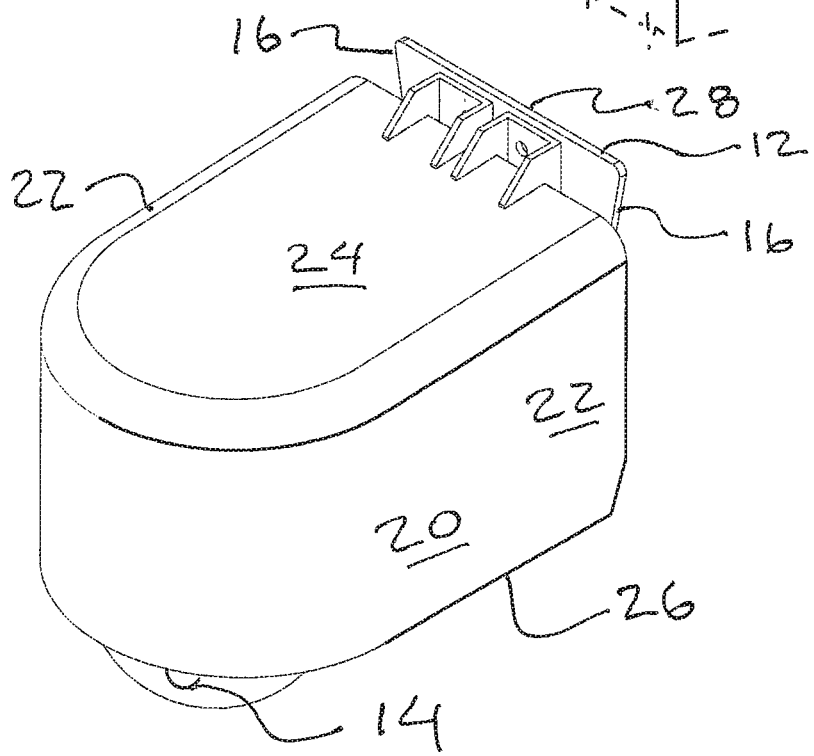
FIG. 2 illustrates a camera enclosure with a support plate as disclosed here.

Turning now to FIGS. 1 and 2 where a support bracket 10 and a support plate 12 made in accordance with principles disclosed here are shown. The support plate 12 is shown attached to a camera enclosure 20, which will house one or more surveillance cameras 14 and any needed remote control mechanisms needed for manipulating the direction of focus for the camera 14, as well as equipment transmitting video signals from the camera. The transmission of the video signals may be through a wireless modem, or through hard-wired connections, depending on the needs for a particular application. For example, a hard-wired connection may be used to eliminate interception of wireless signals.

Figure 3:
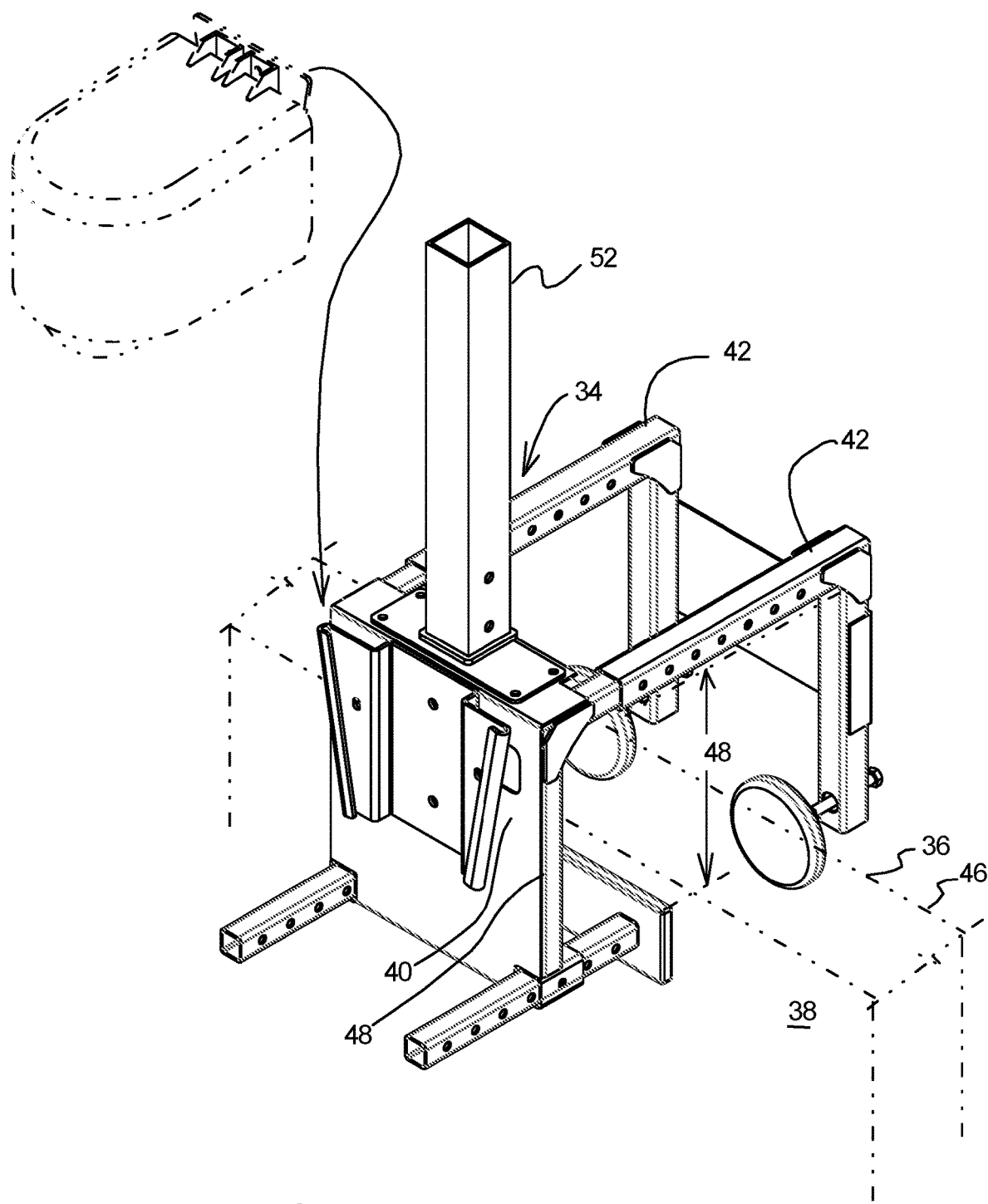
FIG. 3 illustrates a clamp that incorporating novel features disclosed here.

Referring to FIGS. 1-3, it will be understood that the support bracket 10 includes a pair of spaced apart slots 16 that are adapted for accepting a pair of converging sides 16 found on the support plate 12, so that the support plate becomes wedged in the converging slots 18 of the bracket 10 when the support plate is inserted into the converging slots 18 of the support bracket 10. It will be understood that according to an example of the disclosed invention, the converging sides 16 of the support plate 12, so that the support bracket accepts and retains the support plate 12 and the Enclosure at a desired position within the converging slots 18. Accordingly, the converging sides 16 of the support plate may converge towards one another at the same angle as the converging slots 18 converge towards one another in a downward direction. However, it should be understood that a circular support plate of a diameter that will fit between the converging slots 18, but is larger than the narrowest distance between the converging slots 18 may also be used.

As illustrated in FIG. 2, the camera enclosure 20 has sidewalls 22, a top 24, a bottom 26, and a window 28, a preferred illustrated example is shown with the window being generally semi-spherical. The support plate 12 is shown attached to the enclosure 20 at a location along one of the sidewalls 22. The illustrated support plate 18 having a generally planar body 28 with a pair of converging sides 30, but as discussed above, the support plate may be circular or any other configuration that allows the support plate to be captured between the converging support plate slots 18. FIG. 1 illustrates the pair of converging slots 18 extending from a bracket long edge 30 to a bracket short edge 32. Additionally, FIG. 1 shows the bracket long edge 30 being positioned such that it is located near the top 24 of the camera enclosure 20 when the support plate 12 has been accepted within the support plate slots 18 of the bracket 10. Accordingly, the long edge 30 is a first length 31, and the bracket short edge 33 is of a second length, the second length being shorter than the plate long edge and adapted for being near the bottom of the enclosure 20 when the support plate 12 has been inserted into the slots 18 of the bracket 12.

Turning now to FIG. 3 where a portable surveillance system as disclosed here is shown with the support bracket 10 is attached to a support clamp 34. The support clamp 34 is particularly useful for supporting surveillance equipment from a support structure 36, such as a wall 38 of a building. The support clamp 36 will accommodate a large range of variations in the support structure, such as various widths and surfaces. It will be understood that the support clamp 34 will allow the user to position the camera away from the wall 38, while allowing the user to remain protected behind the wall 38. Additionally, it will be understood from FIG. 3 that the support clamp 34 is configured such that tightening of the support clamp 34 is accomplished from behind the wall 38, while the surveillance camera and enclosure are positioned in front of the wall 38.

FIG. 3 illustrates that an example of the support clamp 34 includes an elongated horizontal support beam 40 and one or more, and preferably at least a pair of spaced-apart extendable legs 42 that are supported from the horizontal support beam in a generally coplanar manner. Each of the extendable legs 42 supports an extendable clamping foot 44 that is at a distance from the horizontal support beam 40, and at spaced from the extendable legs 42. The clamping foot is preferably mounted such that it extends down from the extendable legs 42, so that one or more of the clamping feet 44 may then be used to engage or bear against a façade 46 of the support structure 36.

FIG. 3 also shows that the support clamp 34 also includes at least one vertical support beam 48 that extends down from the elongated horizontal support beam 40 to a location that is at a distance from the extendable legs 42 and the clamping foot elongated support beam, so that a clamping force developed by the moving at least one of the clamping feet 44 towards the vertical support beam 48, and thus reduce the distance between the clamping foot 44 and the vertical support beam 48 moved, so that the support clamp may engage a support structure and support the portable surveillance system.

Figure 4:
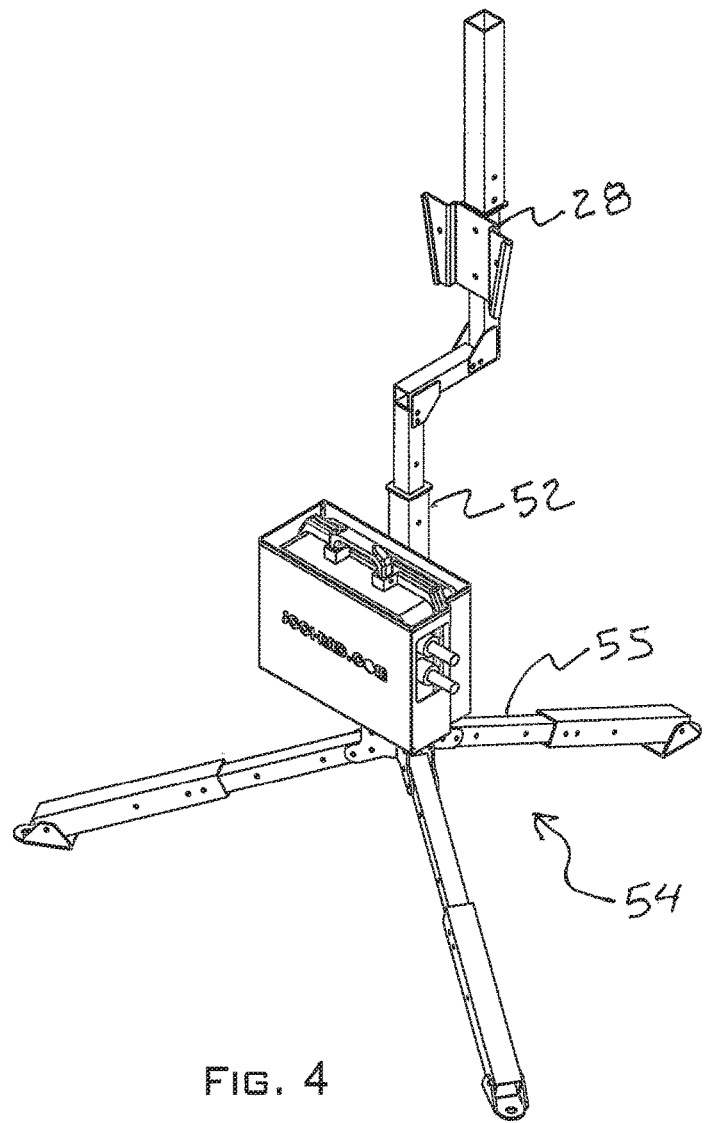
FIG. 4 is a tripod used with structure disclosed here.

Thus, it will be understood that the disclosed system may be used with a support post 52 that is mounted from a support base 53, such as a collapsible tripod 54, shown in FIG. 4.

Figure 5:
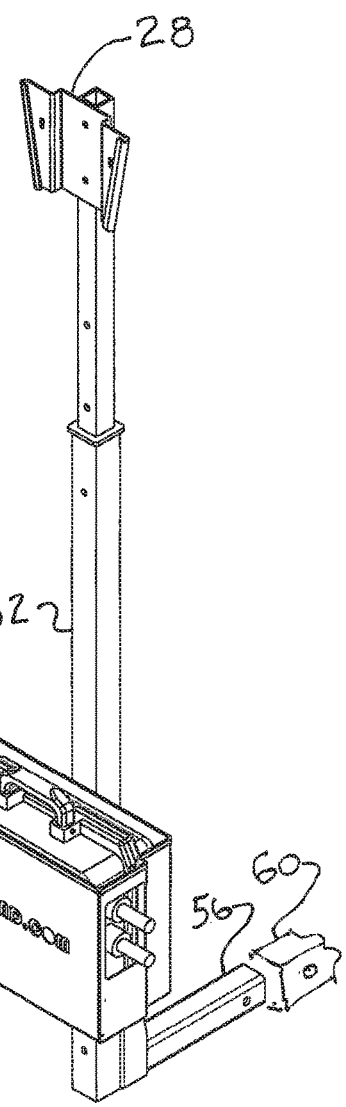
FIG. 5 illustrates an example of an embodiment that cooperates with a receiver hitch to support a surveillance camera.

As shown in FIG. 5, the support post 52 may also be adapted for mounting from a receiver beam 56 that is adapted for being inserted into a vehicle receiver hitch 60, and thus allowing the surveillance system to be supported in the field from the receiver hitch of a vehicle.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A portable surveillance system comprising:
    a camera enclosure, the camera enclosure having sidewalls, a top, a bottom, and a window;
        a generally planar support plate that is attached to the enclosure at a location along the sidewalls, the support plate having a generally planar body, the generally planar body having a pair of converging sides, the pair of converging sides extending from a plate short edge to a plate long edge, the plate long edge being positioned near the top of the camera enclosure, the long edge being of a first length, the plate short edge being near the bottom of the enclosure, the short edge being of a second length, the second length being shorter than the plate long edge;
        a support bracket, the support bracket having a pair of spaced apart slots that are adapted for accepting the pair of converging sides of the support plate, so that the support plate becomes wedged in the support plate slots when inserted into the converging slots of the support bracket, so that the support bracket accepts and retains the support plate and the enclosure.

2. A portable surveillance system according to claim 1 and further wherein the support bracket is attached to a support clamp, the support clamp having an elongated horizontal support beam and a pair of spaced-apart extendable legs that are supported from the horizontal support beam in a generally coplanar manner, each of the extendable legs supporting an extendable clamping foot that is mounted at a distance from the extendable legs;
    the support clamp further comprising a support beam that extends from the elongated horizontal support beam to a location that is at a distance from the extendable legs and the elongated support beam, so that a clamping force developed by the moving at least one of the clamping feet towards the support beam reduced the distance between the clamping foot being moved and the support beam, so that the support clamp may engage a support structure and support the portable surveillance system.

3. A portable surveillance system according to claim 1 and further comprising a support post that is adapted for mounting from a support base, the support post being adapted for attachment to the support bracket, so that the portable surveillance system may be supported from the support base.

4. A portable surveillance system according to claim 3 wherein said support base comprises a receiver hitch male connector.

* * * * *